United States Patent

[11] 3,634,709

[72] Inventor: Jacques Le Henaff
    Paris, France
[21] Appl. No.: 44,516
[22] Filed: June 8, 1970
[45] Patented: Jan. 11, 1972
[73] Assignee: Compagnie Electro-Mecanique
    Paris, France
[32] Priority: June 17, 1969
[33] France
[31] 6920134

[54] ARRANGEMENT FOR SECURING CONDUCTORS IN ROTOR SLOTS OF DYNAMOELECTRIC MACHINE
1 Claim, 9 Drawing Figs.

[52] U.S. Cl. .................................................. 310/214, 310/270, 310/271
[51] Int. Cl. .................................................. H02k 3/48
[50] Field of Search .................................................. 310/214, 270, 271

[56] References Cited
UNITED STATES PATENTS

| | | | |
|---|---|---|---|
| 3,008,786 | 11/1961 | Costello | 310/214 |
| 3,065,367 | 11/1962 | Costello et al. | 310/271 |
| 3,048,725 | 8/1962 | Wesolowski | 310/271 |
| 1,769,816 | 7/1930 | Yokota | 310/271 |
| 1,748,242 | 2/1930 | Papst | 310/271 X |
| 1,028,985 | 6/1912 | Behrend | 310/214 UX |
| 3,179,828 | 4/1965 | Apking et al. | 310/271 X |
| 965,925 | 8/1910 | McLeod | 310/271 UX |

Primary Examiner—William H. Beha, Jr.
Assistant Examiner—Mark O. Budd
Attorney—Pierce, Scheffler & Parker ABSTRACT: A rotor construction for a dynamoelectric machine is provided with the usual arrangement of longitudinally extending slots within which to receive the conductor bars of a distributed winding. Retainer bars making a dovetail connection with the outer ends of the rotor slots serve to secure the slot conductors in place, and end portions of these retainer bars extend beyond the rotor slots so as to overlie the end turn portions of the winding. In order to hold these portions of the retainer bars in place over the end turn portions of the winding a double layer helical wire winding is applied. The layers are wound from a single length of wire, which is of rectangular cross section and preferably made of a material which has high tensile strength and is also conductive such as bronze, and the opposite ends of the wire are anchored to the end heads of adjacent retainer bars. The wire is also soldered to the retainer bars so as to establish a short circuit ring interconnecting all of the retainer bars, also conductive, which thereby establishes a cage similar to that used in asynchronous motors.

Inventor

Jacques Le Henaff

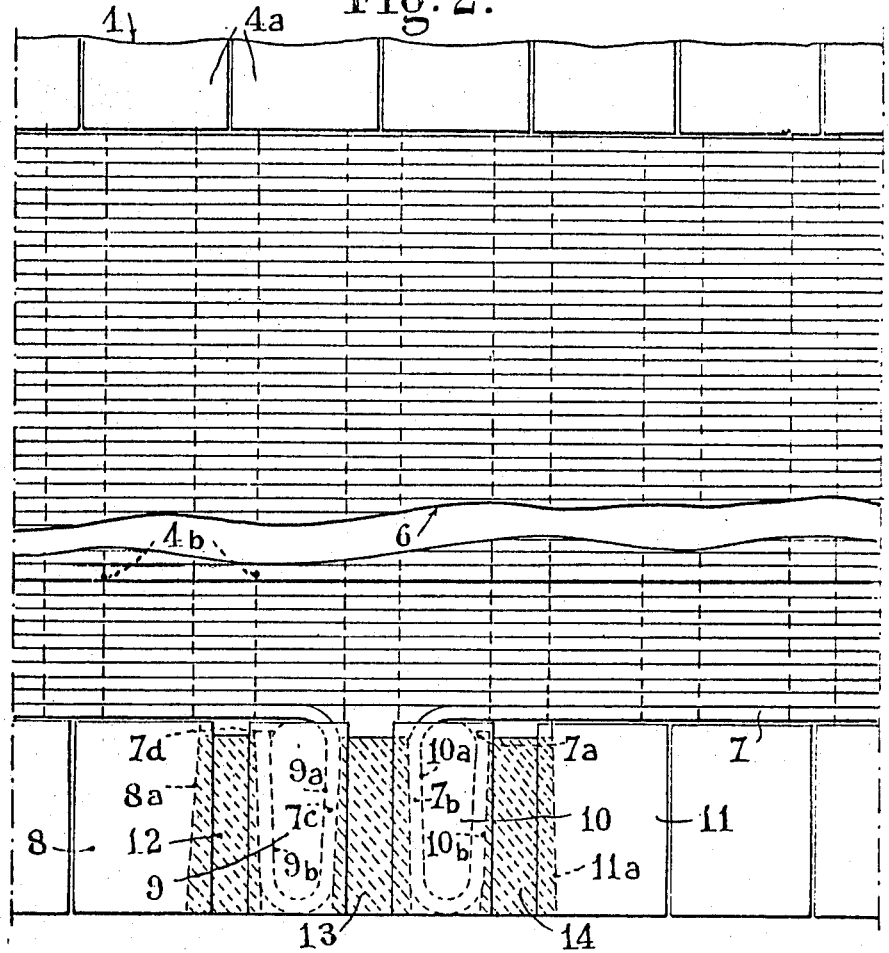
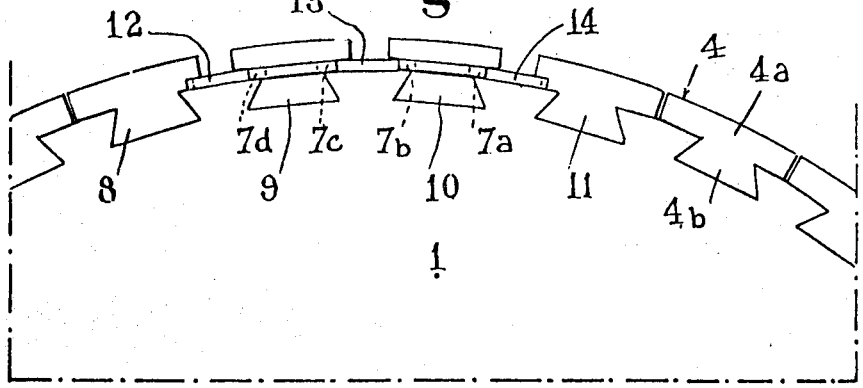

ARRANGEMENT FOR SECURING CONDUCTORS IN ROTOR SLOTS OF DYNAMOELECTRIC MACHINE

This invention relates to dynamo-electric machines and is directed to an improvement in the construction of the rotor elements of such machines. More particularly, the invention is concerned with the general problem of securing the rotor winding in place so as to prevent dislodgment due to the strong centrifugal forces which are set up on the rotor conductors as the rotor turns at relatively high speeds.

It is conventional, in the construction of rotors of dynamoelectric machines, to locate the conductors of the winding in longitudinally extending slots opening to the surface of the rotor, and to retain the conductors in the slots by means of bars which close the mouths of the slots, the bars being retained in place by means of a dovetail connection with the walls of the rotor slots.

These retainer bars project beyond the ends of the longitudinally extending rotor slots and cover the head portions of the rotor conductors, i.e. those portions of the winding which extend partially around the rotor in the peripheral direction in leaving one slot and reentering another slot. These end portions of the bars cannot, of course, be dovetailed into the body of the rotor where they overlie the head portions of the winding and hence, are subject to centrifugal stresses which tend to throw them in a radially outward direction. Similar centrifugal forces exerted on the head ends of the rotor winding also add to the difficulty since these head portions likewise tend to be thrown radially outward against the bars. Thus, to prevent dislodgement of the head ends of the winding and also of the overlying end portions of the slot conductor retainer bars, it is necessary to utilize special retainer means.

One well-known retainer structure is constituted by a massive sleeve which surrounds the end portions of the retainer bars, the sleeve being heated and then shrunk into place over the bars. However, because of the intense radial forces exerted on the head or end turn portions of the rotor winding and the end portions of the retainer bars, the sleeve is required to have substantial thickness. In certain applications, however, it is not possible to tolerate a retainer sleeve of substantial thickness, one reason being that the allowable thickness of the sleeve must be less than a maximal value imposed by dimensional characteristics of the machine. Another reason is that the retainer sleeve functions also as a short-circuit ring which can, therefore, give rise to substantial heating to the currents induced thereon.

The object of the present invention is therefore to provide an improved retainer construction for the slot conductor retainer bars, i.e. for those end portions of the bars which overhang the head portions of the rotor winding, which is not only mechanically strong but also has the advantage of being relatively thin.

More particularly, in accordance with the invention, the retainer structure is constituted by a multiple layer type winding of coaxial helices wound from a single length of wire and which surround the retainer bars, the opposite ends of the wire being anchored on head portions at the ends of adjacent retainer bars.

The wires from which the two helices are wound is preferably also electrically conductive, so that it together with the peripheral array of retainer bars on which it is wound establishes a short circuited cage of the type utilized with asynchronous motors.

The wire chosen for the retainer, must also have a very high mechanical, i.e. tensile strength and is thus made from a material having such characteristic, such as, for example, bronze.

The wire type retainer structure in accordance with the invention offers the advantage of providing maximal security for the end portions of the slot conductor retainer bars which extend beyond the longitudinal slots in the rotor, when the rotor is turning at high speeds.

One suitable embodiment of the invention is described hereinafter in detail and is illustrated in the accompanying drawings wherein:

FIG. 2 is a partially developed view of the rotor of FIG. 1, drawn to a larger scale;

FIG. 3 is an end view of a portion of the rotor;

Figure 1:
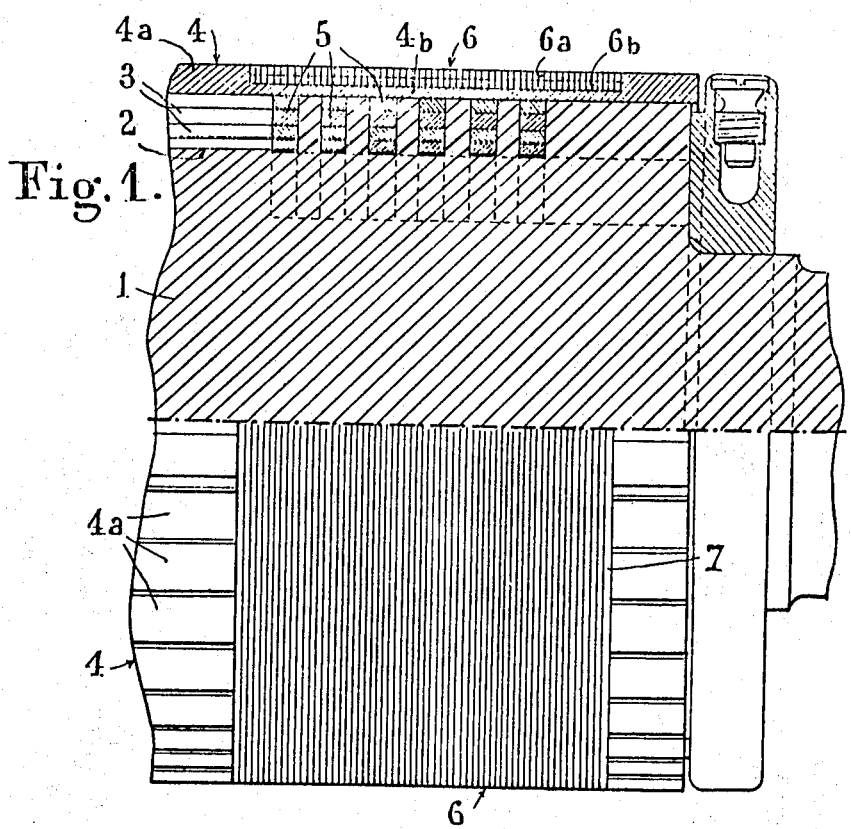
FIG. 1 is a partial longitudinal view of a rotor from one end thereof towards the middle, the lower half being shown in elevation and the upper half in section.

With reference now to the drawings, and to FIG. 1–3 in particular, the rotor of the dynamoelectric machine is constituted by the usual elongated cylindrically shaped iron body 1 provided on its periphery with longitudinally extending slots 2 in which are lodged the conductors 3 of the rotor winding, there being usually several conductors seated in each rotor slot. In order to hold the conductors 3 in their slots against the centrifugal force which arises as the rotor is rotated at high speed, it will be seen that the entrance to each slot is given a trapezoidal configuration which thereby forms a dovetail in which is received a complementary trapezoidal configured portion 4b of a metallic and preferably electrically conductive retainer bar 4, the bar 4 being also provided with another portion 4a having an elongated rectangular cross section which overlaps the side edges of the rotor slot at its entrance.

The end portions of the retainer bars 4 extend beyond the longitudinally extending conductor slots in the rotor and lie above the head i.e. end turn portions 5 of the winding which extend in the circumferential direction in circumferential slots, after they leave the longitudinal rotor slots, for a certain distance so that they can reenter other longitudinal slots in the rotor. The end portions of the retainer bars 4, which extend beyond the longitudinal rotor slots and overlie the head portions 5 of the windings, unlike the remaining portions of bars 4 which are secured by their dovetailed interengagement with the longitudinal rotor slots, have nothing to secure them against the radially outward forces which arise as a result of rotor rotation. In accordance with the present invention, these end portions of the retainer bars 4 function to hold the head portions of the rotor winding securely in place, and are themselves held securely in place by a novel retainer structure constituted by a multiple layer, helical wire winding, the wire preferably being made of an electrically conductive material and which also has a high degree of tensile strength such as, for example, bronze. Being electrically conductive and in contact with the array of retainer bars which surround the rotor in parallel spaced relation and are also electrically conductive, the bars and wire retainer together establish a cage of short-circuited conductors similar to that utilized in asynchronous motor construction.

The wire type retainer structure 6 for the end portions of the bars 4 is formed from a wire 7, preferably of rectangular cross section. Wire 7 is wound around the peripheral array of the bars 4 in a "thinned out" portion of the latter established by removing the outer rectangular portion 4a, thus leaving only the trapezoidal configuration portion 4b. The wire 7 is also wound in two superposed coaxial helical layers 6a and 6b from one length of wire and the ends of the wire are suitably anchored in especially configured heads formed on the extreme outer ends of four adjacent bars 4.

With reference now to FIGS. 2 and 3, it will be seen that the end heads 8, 9, 10 and 11 of four adjacent bars 4 have a transverse configuration which is essentially the same as that of an intermediate portion of the bar associated with a longitudinal slot in the rotor. That is, each of these end heads 8 to 11 includes an outer portion 4a' of elongated rectangular cross section and an inner portion 4b' of trapezoidal cross section which is entered into and retained by a longitudinal groove in the rotor of complementary configuration so as to establish a dovetail type of interconnection.

The heads 8 to 11 are especially machined so as to provide anchor points for the opposite ends of the wire 7, and to enable the wire ends to be additionally secured at those anchors by means of plates 12 to 14 which are wedged into place against the wire ends between overhanging portions of the rectangular parts 4a' and the surface of the rotor.

Figure 4:
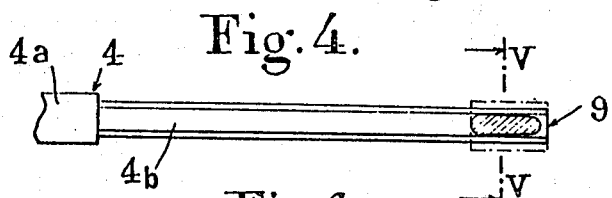
FIG. 4 is a view partially in plan and partially in section of an end portion of a bar used to retain the head portion of the conductors of the rotor winding.
Figure 5:
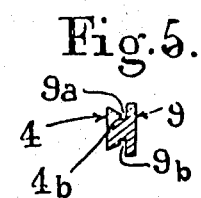
FIG. 5 is a transverse sectional view taken on line V—V of FIG. 4.
Figure 6:
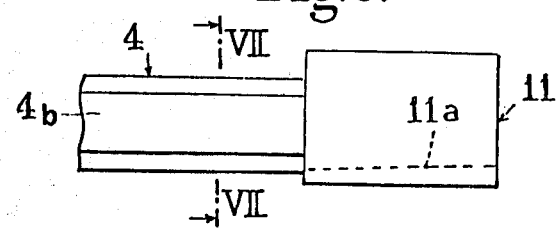
FIG. 6 is a plan view, drawn to larger scale than FIG. 4, of a similar end portion of another retainer bar.
Figure 7:
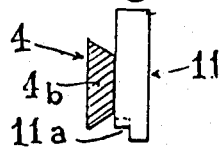
FIG. 7 is a transverse sectional view taken on line VII—VII of FIG. 6.
Figure 8:
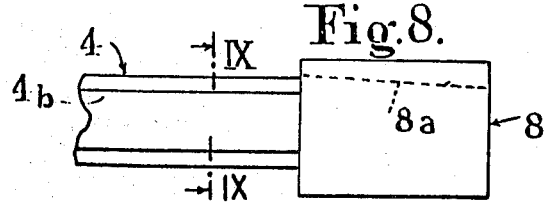
FIG. 8 is also a plan view, also drawn to a larger scale than FIG. 4 of a similar end portion of another retainer bar.
Figure 9:
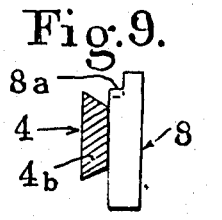
FIG. 9 is a transverse sectional view taken on line IX—IX of FIG. 8.

The anchoring end heads 9 and 10 of the two centrally located bars 4 of the group of four adjacent bars are machined in the same manner, according to the configuration depicted in detail in FIGS. 4 and 5. As can be seen in these two views, two longitudinally grooves 9a, 9b are formed in opposite sidewalls of the head 9, these grooves being slightly inclined with respect to the longitudinal axis of the bars and converging to the exterior of the rotor. The anchoring end head 10 is machined in the same manner as head 9 and is also provided with two opposite grooves 10a and 10b.

As distinguished from the heads 9 and 10, the two outer heads 8 and 11 of the outermost bars of the four bar group are machined so as to have only one groove 8a (11a) these grooves being symmetrical with respect to a radial plane as is evident from an inspection of FIGS. 6 to 9.

Anchoring of the two ends of wire 7 is accomplished in the manner depicted quite clearly in FIG. 2. First, one end 7a of the wire is engaged in groove 10b of anchoring head 10 of a bar 4 and it is then bent back into a U-shape so that a subsequent part 7b of the wire is lodged in the other groove 10a. With this end of the wire anchored, the wire is then wound in helical form around and on the trapezoidal sectioned parts 4b of the peripheral array of bars 4 to form the first layer 6b, the winding proceeding in the direction away from the heads 8–11. After the first helical layer 6b has been wound, the second helical layer 6a is wound proceeding in the opposite direction and arriving back at the heads 8–11. A portion 7c near the end of the wire is then engaged in groove 9a of head 9 facing groove 10a of head 10, the wire is bent back into U-shape, and finally the extreme end 7d of the wire is engaged in groove 9b of anchor head 9.

To ensure that the ends 7a to 7d of the wire 7 will be retained in place in the grooves provided in the heads, the plates 12, 13 and 14 are then force-fitted longitudinally into place between the head 4a' and the rotor surface. As shown in FIG. 2, one side of plate 12 engages groove 8a of head 8 and the other side engages the wire end 7d. The centrally located plate 13 which is longer than plates 12 and 14, has its opposite sides tightly engaged with the wire portions 7b and 7c, and the plate 14 has one side engaged with the wire end 7a and the other side with groove 11a of head 11.

After the plates 12, 13 and 14 are fitted into place against the end portions of wire 7, one may then solder the plates to the wire 7 and also to the clamping heads 8 to 11 if additional security against dislodgment of the plates and wire is desired.

When finished, the wire retainer 6 is thus seen to consist of a radially inner helical winding 6a applied to the end portions of the bars 4, and a radially outer helical winding 6b applied directly upon the inner winding 6b, the two winding layers being of the same axial length, and with the adjacent convolutions of each helix in contact with each other, as depicted in FIG. 1. Moreover, since the wire has a rectangular cross section and adjacent convolutions are in contact with each other, each helical layer has essentially the same amount of material as a solid sleeve of the same dimensions.

The helical wire retainer 6, in addition to functioning as a means for binding the end portions of the bars 4 and head portions of the rotor winding in place, also has the additional advantage, due to the wire 7 being also electrically conductive, of functioning to establish a short circuit for all of the bars 4, also conductive, on the rotor, thus forming a cage of the type which is associated with asynchronous type motors. In order to improve the electrical connection and hence the short circuit, the wire 7 can be soldered to the bars 4.

A further advantage of the helical wire retainer 6 is that as a result of the unique anchoring device, it has a very smooth external surface thus permitting only very small mechanical gaps.

In conclusion, it is desired to note that the illustrated embodiment of the invention is to be considered as typical only, and that one may depart in detail from the particulars of the illustrated construction without, however, departing from the spirit and scope of the invention as defined in the appended claims.

I claim:

1. In a rotor construction for a dynamoelectric machine the combination comprising a cylindrical rotor provided with a peripheral array of longitudinally extending slots in the outer surface thereof, a distributed winding for said rotor including conductor bars having longitudinally extending conductor portions disposed in said slots and end turn portions extending beyond said slots and which extend in a circumferential direction, retainer bars located in said rotor slots above the conductor bars for retaining the conductor bars in the slots, and retainer bars extending longitudinally to provide end portions which overlie said end turns on said winding and which terminate in end heads each including a trapezoidal configured portion engaged in a complementary configured slot in the rotor and a rectangular configured portion disposed above the surface of the rotor, a double layer helical wire winding applied on said end portions of said retainer bars for retaining said end turn portions of said conductor bars in place, said double layer helical winding being wound from one continuous length of wire having a rectangular cross section, the terminal ends of said wire being received in corresponding grooves in the end heads of adjacent end portions of said retainer bars, and plate members slidable into place between the undersurface of said rectangular configured portions of said end heads and the rotor surface to engage said terminal ends of said wire and secure them in place within said grooves.

* * * * *

UNITED STATES PATENT OFFICE
CERTIFICATE OF CORRECTION

Patent No. 3,634,709     Dated January 11, 1972

Inventor(s) Jacques Le Henaff

It is certified that error appears in the above-identified patent and that said Letters Patent are hereby corrected as shown below:

Claim 1, line 10 - "and" should be

-- said --

Signed and sealed this 30th day of May 1972.

(SEAL)
Attest:

EDWARD M. FLETCHER, JR.
Attesting Officer

ROBERT GOTTSCHALK
Commissioner of Patents